(12) United States Patent
Riley et al.

(10) Patent No.: US 6,472,446 B1
(45) Date of Patent: Oct. 29, 2002

(54) PHASE STABLE POLYOL COMPOSITION CONTAINING HYDROCARBON AS THE BLOWING AGENT

(75) Inventors: Robert E. Riley, Flat Rock, MI (US); Walter R. White, III, Trenton, MI (US); Jim Patterson, New Boston, MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 09/803,343

(22) Filed: Mar. 9, 2001

(51) Int. Cl.$^7$ .................................................. C08J 9/00
(52) U.S. Cl. ............. 521/131; 252/182.25; 252/182.26; 252/182.27; 252/182.29; 521/167; 521/173; 521/174
(58) Field of Search ........................ 252/182.25, 182.26, 252/182.27, 182.29; 521/131, 167, 173, 174

(56) References Cited

U.S. PATENT DOCUMENTS

| | | | | |
|---|---|---|---|---|
| 4,629,768 A | * | 12/1986 | Hire et al. | 525/458 |
| 5,677,359 A | * | 10/1997 | White et al. | 521/131 |
| 5,684,057 A | * | 11/1997 | White et al. | 521/131 |
| 6,348,161 B1 | * | 2/2002 | White et al. | 252/182.24 |

* cited by examiner

Primary Examiner—John M. Cooney, Jr.
(74) Attorney, Agent, or Firm—Fernando A. Borrego

(57) ABSTRACT

The present invention discloses a phase stable polyol blend composition containing a sucrose and dipropylene glycol co-initiated propylene oxide polyether polyol, a polyester polyol, a compatibilizing agent and a hydrocarbon blowing agent. The polyester polyol is preferably a phthalic anhydride-initiated polyester polyol. The compatibilizing agent is a butanol-initiated propylene oxide polyether surfactant.

23 Claims, No Drawings

PHASE STABLE POLYOL COMPOSITION CONTAINING HYDROCARBON AS THE BLOWING AGENT

FIELD OF THE INVENTION

This invention generally relates to dimensionally stable polyurethane/polyiscyanurate foams and to polyol blends used to make such foams. Particularly, the present invention relates to polyol blends comprising a co-initiated propylene oxide polyether polyol, a polyester polyol, a hydrocarbon blowing agent and a compatibilizing agent.

BACKGROUND OF THE INVENTION

Due to environmental legislation restricting the use of chloroflorocarbons and hydrochloroflorocarbons as blowing agents, hydrocarbons are being employed in greater numbers as viable alternative blowing agents in the manufacture of rigid polyurethane or polyisocyanurate foams. Hydrocarbons are readily available and provide a cost-effective alternative to chloroflorocarbons and hydrochloroflorocarbons.

Due to the non-polar hydrophobic characteristics of hydrocarbons, they are only partially soluble in many polyols used to manufacture rigid polyurethane or polyisocyanurate foams. As a result of the poor solubility of hydrocarbon blowing agents, the blowing agent must usually be added to the polyol just prior to dispensing it through a mix head. The limited shelf life of hydrocarbon-polyol mixtures has limited the ability of storing batches for later use.

Another problem with these mixtures is their potential limited process phase stability or limited resistance to separation into layers of different composition. If there is a phase separation during the process, the hydrocarbon blowing agent has the tendency to rise to the top of the mixture and vaporize; thereby posing a potential safety hazard should the concentration of the hydrocarbon reach the explosion limit.

A phase separation during the process often causes non-uniform and uneven cell structures in the resultant polyurethane or polyisocyanurate foam. Such non-uniform cell structure can lead to variations in the properties of a foam product, such as the thermal conductivity or insulation value (R-factor). It would be undesirable to have such variations, particularly for foams utilized for insulation applications. The density of the foam may also be affected by the phase separation, leading to undesirable physical characteristics, such as increased hardness or brittleness.

SUMMARY OF THE INVENTION

There is provided a phase stable polyol blend composition comprising a polyether polyol, a polyester polyol, a compatibilizing agent and a hydrocarbon blowing agent. The polyol blend components including the hydrocarbon blowing agent forms a micro-emulsion and is therefore soluble and phase stable in the polyol blend. Upon forming a substantially homogeneous blend of the composition's components, the composition remains phase stable for at least 24 hours.

In one embodiment, the polyether polyol component comprises a sucrose and dipropylene glycol co-initiated propylene oxide polyether polyol.

In another embodiment, the polyester polyol utilized in the invention is a phthalic anhydride-initiated polyol.

The hydrocarbon blowing agents in the composition are $C_4$–$C_6$ hydrocarbons or mixtures thereof. The pentanes are particularly preferred and are present in the polyol blend in amounts of from 20 to 30 parts by weight based on the total weight of the polyol composition.

The compatibilizing agents useful in the present invention are butanol-initiated propylene oxide polyether surfactants.

In another embodiment, an additional polyether polyol may be used as a substitute for the polyester polyol or may be combined with the composition. The additional polyether polyol is preferably a TDA-initiated propylene oxide polyether polyol.

DETAILED DESCRIPTION OF A PREFERRED EMBODIMENT

The phase stable polyol blend of the present invention includes a propylene oxide polyether polyol, a polyester polyol, a compatibilizing agent and a hydrocarbon blowing agent.

The phase stable polyol blend is deemed to be phase stable when the blend composition has the capacity of retaining the hydrocarbon blowing agent in solution for a specified period of time; generally at least 24 hours, after blending the polyol composition components. Generally, a determination as to the phase stability of the composition is measured by mixing the hydrocarbon blowing agent with the propylene oxide polyether polyol, polyester polyol, and compatibilizing agent in a clear container having a lid. The container is then agitated vigorously to fully mix the composition, and the container is allowed to stand undisturbed for at least a 24-hour period. If there is no visible phase separation into distinct layers, or a cloudy appearance, then the composition is deemed to be phase stable.

Methods of forming polyoxyalkylene polyether polyols are well known, for example, by the base catalyzed addition of alkylene oxides to an initiator molecule containing reactive hydrogens such as a polyhydric alcohol. In one embodiment of the present invention, the initiator molecules are a combination, mixture or blend of a diol and a sugar. Other examples of such initiators include: glycerol; 1,1,1-trimethylolpropane; 1,1,1-trimethylolethane; 1,2,6-hexanetriol; pentaerythritol; and sorbitol. Other suitable initiators include both aliphatics and aromatics, such as ethylene glycol, propylene glycol, dipropylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol. Also included within the term "polyhydric alcohol" are compounds derived from phenol such as 2,2-bis(4-hydroxyphenyl)propane, commonly known as Bisphenol A. The polyether polyols may be prepared by any known process such as, for example, the process disclosed by Wurtz in 1859, *Encyclopedia of Chemical Technology,* Vol. 7, pp. 257–262, Published by Interscience Publishers, Inc. (1951) or in U.S. Pat. No. 1,922,459, incorporated herein by reference.

Examples of useful alkylene oxides include ethylene oxide, propylene oxide, butylene oxide, amylene oxide, mixtures thereof, tetrahydrofuran, alkylene oxide-tetrahydrofuran mixtures, epihalohydrins, and aralkylene styrene. The alkylene oxides are added onto the initiator molecule and chain propagation is carried out in the presence of catalysts by either anionic polymerization or by cationic polymerization.

The preferred catalysts are potassium hydroxide, sodium hydroxide, alcoholates of potassium hydroxide, alcoholates of sodium hydroxide, cesium catalysts, amines, Lewis acid catalysts, or double metal complex catalysts, all of which are known in the art.

The phase stable polyol blend of the present invention contains a propylene oxide polyether polyol, a polyester polyol, a compatibilizing agent, and a hydrocarbon blowing agent. Other ingredients that may be included in the phase stable polyol blend are additional polyols, catalysts, surfactants, other blowing agents, flame retardants, fillers, stabilizers and other additives.

The propylene oxide polyether polyol useful in accordance with the present invention comprises a sucrose and dipropylene glycol co-initiated polyoxyalkylene polyether polyol having only propylene oxide as the alkylene oxide. It has been found that the addition of other alkylene oxides, for example, ethylene oxide to the initiator molecules may adversely affect the solubility of the hydrocarbon blowing agent in the polyol composition.

The sucrose and dipropylene glycol co-initiated polyol preferably has a nominal functionality between 4 and 5, even more preferably of 4.4. The co-initiated polyol has a hydroxyl number from 250 to 400 meq polyol/g KOH. Even more preferably, the polyol has a hydroxyl number of from 300 meq polyol/g KOH to 400 meq polyol/g KOH. The sucrose and dipropylene glycol co-initiated polyol is preferably present in an amount of from 30 to 80 parts by weight based on the overall weight of all components of the phase stable polyol blend.

In one embodiment of the present invention an additional polyether polyol, a toluene diamine (TDA)-initiated polyoxyalkylene polyether polyol having only propylene oxide as the alkylene oxide may be included. The TDA-initiated polyol, preferably has a hydroxyl number of from between 350 meq polyol/g KOH and 450 meq polyol/g KOH, and a nominal functionality between 3.5 and 4.5. The TDA-initiated polyol is preferably present in an amount of from 15 to 25 parts by weight based on the overall weight of all components of the phase stable polyol composition.

The polyester polyol of the phase stable polyol blend of the present invention is preferably a phthalic anhydride-initiated polyester polyol. Preferably, the polyester polyol has a hydroxyl number of from 200 to 300 meq polyol/g KOH.

A particularly preferred polyester polyol of the present invention includes STEPANPOL® PS 2352, a phthalic anhydride-initiated polyester polyol commercially available from Stepan Chemical Company (Northfield, Ill.).

The overall amount of the polyester polyol is preferably between 15 and 25 parts by weight based on the overall weight of all components of the phase stable polyol blend. Even more preferably the polyester polyol is present in an amount between 17 and 23 parts by weight based on the overall weight of all components of the phase stable polyol blend.

The compatibilizing agent of the present invention is a butanol-initiated polyoxyalkylene polyether surfactant. As with the aforementioned polyether polyols, the compatibilizing agent preferably only has propylene oxide as the alkylene oxide portion. The compatibilizing agent preferably has a hydroxyl number of from 100 to 200 meq surfactant/g KOH.

A particularly preferred compatibilizing agent of the present invention includes Ortegol® 410, a butanol-initiated polyether surfactant commercially available from Goldschmidt Corporation.

The overall amount of the compatibilizing agent can be from about 10 to 30 parts by weight, and is preferably between 10 and 20 parts by weight, more preferably between 12 and 16 parts by weight, based on the overall weight of all components of the phase stable polyol blend. Even more preferably, the compatibilizing agent is present in an amount of about 14 parts by weight based on the overall weight of all components of the phase stable polyol blend.

In addition to the foregoing, the phase stable polyol blend of the present invention includes a blowing agent comprising a $C_4$–$C_6$ hydrocarbon and mixtures thereof. The blowing agent may be added and incorporated into the polyol blend for storage and later use in a foaming apparatus or may be added to a preblend tank in the foaming apparatus and incorporated in the polyol blend prior to pumping the foaming ingredients to the mixhead. Alternatively, the blowing agent may be added to the foaming ingredients in the mixhead as a separate stream.

Generally, the amount of blowing agent in the polyol blend can be from about 10 to 30 parts by weight, and is preferably from 10 to 20 parts by weight, even more preferably approximately 15 parts by weight based on the total weight of all components in the polyol blend composition.

Examples of $C_4$–$C_6$ hydrocarbon blowing agents include butanes, pentanes, hexanes and mixtures thereof. Preferred blowing agents are the pentanes including isopentane, normal pentane, cyclopentane, and neopentane. The pentanes may be incorporated into the phase stable polyol blend of the present invention alone or as a mixture of two or more of the pentanes. For example, normal pentane mixed with isopentane or cyclopentane may be utilized by the present invention. It is less desirable to utilize cyclopentane as the only blowing agent, as cyclopentane reaches a saturation point quickly and therefor may form a condensate during processing that may result in a poor cellular structure for the foam. However, mixtures having cyclopentane as a component may be utilized by the present invention.

The hydrocarbon blowing agents of the present invention are generally available from manufacturers of fractional distillation products from petroleum, including Phillips Petroleum and ExxonMobil Corporation.

The polyol blend of the present invention may be utilized to produce a polyisocyanurate or polyurethane foam. The isocyanate component is preferably a polyisocyanate, herein defined as having two or more isocyanate functionalities. Examples of these include conventional aliphatic, cycloaliphatic, and preferably aromatic isocyanates. Specific examples include: alkylene diisocyanates with 4,2,12 carbons in the alkylene radical such as 1,12-dodecane diisocyanate, 2-ethyl-1,4-tetramethylene diisocyanate, 2-methyl-1,5-pentamethylene diisocyanate, 1,4-tetramethylene diisocyanate and 1,6-hexamethylene diisocyanate; cycloaliphatic diisocyanates such as 1,3- and 1,4-cyclohexane diisocyanate as well as any mixtures of these isomers, 1-isocyanato-3,3,5-trimethyl-5-isocyanatomethylcyclohexane (isophorone diisocyanate), 2,4- and 2,6-hexahydrotoluene diisocyanate as well as the corresponding isomeric mixtures 4,4'-2,2'- and 2,4'-dicyclohexylmethane diisocyanate as well as the corresponding isomeric mixtures and preferably aromatic diisocyanates and polyisocyanates such as 2,4- and 2,6-toluene diisocyanate and the corresponding isomeric mixtures, and 2,2'-diphenylmethane diisocyanate and the corresponding isomeric mixtures, mixtures of 4,4'-, 2,4'-, and 2,2-diphenylmethane diisocyanates and polyphenylene polymethylene polyisocyanates (crude MDI).

In one embodiment, the polyisocyanate component used in conjunction with the polyol blend of the present invention is a polymeric diphenylmethane diisocyanate (MDI) having a nominal functionality of approximately 3, and an NCO content of approximately 31 weight percent.

A particularly preferred polyisocyanate component of the present invention includes Lupranate® M70R, a polymeric MDI commercially available from BASF Corporation (Mt. Olive, N.J.).

Generally, the isocyanate and the phase stable polyol blend are combined at an isocyanate index of from 200 to 300, preferably at 250, for polyisocyanurate rigid foams.

The catalysts used for the preparation of foams with the polyol blend and isocyanate component are, in particular, components that accelerate the reaction of the hydroxyl groups of the polyol with the isocyanate groups. Suitable catalysts are organic metal compounds, preferably organic tin compounds such as tin (II) salts of organic carboxylic acids, e.g., tin (II) acetate, tin (II) octoate, tin (II) ethylhexanate and tin (II) laurate, and the dialkyltin (IV) salts of organic carboxylic acids, e.g., dibutyltin diacetate, dibutyltin dilaurate, dibutyltin maleate, and dioctyltin diacetate. The organic metal compounds are used alone or preferably in combination with strongly basic amines. Examples which may be mentioned are amines such as 2,3-dimethyl-3,4,5, 6-tetrahydropyrimidine or tertiary amines such as triethylamine, tributylamine; dimenthylbenzylamine; N-methylmorpholine; N-ethylmorpholine; N-cyclohexylmorpholine; N,N,N', N'-tetramethylethylenediamine; N,N,N',N'-tetramethylbutanediamine; N,N,N',N'-tetramethylhexane-1, 6-diamine; pentamethyldiethylenetriamine; bis (dimethylaminoethyl)ether; bis(dimethylaminopropyl)urea; dimethylpiperazine; 1,2-dimethylimidazole; 1-azabicyclo(3, 3,0)octane and preferably 1,4-diazabicyclo(2,2,2)octane. Additionally, one can use alkanolamine compounds such as triethanolamine; triisopropanolamine; N-methyldiethanolamine and N-ethyldiethanolamine and dimethylethanolamine.

Additional suitable catalysts include: tris (dialkylaminoalkyl)-s-hexahydrotriazines, in particular tris (N,N-dimethylaminopropyl)-s-hexahydrotriazine; tetraalkylammonium hydroxides such as tetramethylammonium hydroxide; alkali metal hydroxides such as sodium hydroxide and alkali metal alkoxides such as sodium methoxide and potassium isopropoxide and also alkali metal salts of long-chain fatty acids having from 10 to 20 carbon atoms and possibly lateral OH groups in combinations of the organic metal compounds and strongly basic amines. Preference is given to using from 0.001 to 5% by weight, in particular from 0.05 to 2% by weight, of catalysts or catalyst combination, based on the weight of the polyol.

In one embodiment, suitable catalysts are organic metal compounds, preferably organic potassium compounds such as potassium salts of organic carboxylic acids, e.g., potassium acetate, potassium octoate and potassium formate. The organic metal compounds are used alone or preferably in combination with strongly basic amines. Examples of such amines are, 2,3-dimethyle-3,4,5,6- tetrahydropyrimide or tertiary amines such as triethylamine, tributylamine, dimenthybenzylamine. A particularly preferred amine of the present invention is pentamethyl diethylenetriamine (PMDEA).

Preferably the organic metal compound is present in an amount of from 2 to 7 parts by weight based on the overall weight of all components of the phase stable polyol blend, even more preferably in an amount of from 2 to 3 parts by weight based on the overall weight of all components of the phase stable polyol blend.

Suitable surface-active substances that may also be added include, for example, compounds, which serve to aid the homogenization of the starting materials and also may be suitable for regulating the cell structure. Examples which may be mentioned are emulsifiers such as the sodium salts of castor oil sulfates or fatty acids and also amine salts of fatty acids, e.g. Diethylamine oleate, diethylamine sterate, diethylamine ricinoleate, salts of sulfonic acid, e.g. Alkali metal or ammonium salts of dodecylbenzene-or dinaphthylmethanedisulfonic acid and ricinoliec acid; foam stabilizers such as siloxane-oxyalkylene copolymers and other organopolysiloxanes, ethoxylated alkylphenols, ethoxylated fatty alcohols, paraffin oils, castor oil or ricinoliec esters, Turkey red oil and peanut oil. Additives may also include cell regulators such as paraffins, fatty alcohols, dimethylpolysiloxanes. Oligomeric polyacrylates having polyoxyalkane and fluoroalkane radicals as side groups are also suitable for improving the emulsifying action, the cell structure and/or stabilizing the foam. The surface-active substances are usually employed in amounts of from 0.01 to 5 parts by weight, based on 100 parts by weight of the polyol components other than the isocyanate component.

Suitable chain extender/crosslinkers that may be used include diols and/or triols having molecular weights of less than about 400. Examples of suitable chain extenders/ crosslinkers are aliphatic, cycloaliphatic and/or aromatic diols having from 2 to 14, preferably from 4 to 10, carbon atoms, e.g., ethylene glycol; 1,3-propanediol; 1,10-decanediol; o-, m-, p-dihydroxycyclohexane; diethylene glycol; dipropylene glycol, and preferably 1,4-butanediol, 1,6-hexanediol and bis(2-hydroxyethyl)hydroquinone, triols such as 1,2,4- and 1,3,5-trihydroxyclylohexane, and low molecular weight hydroxyl-containing polyalkylene oxides based on ethylene oxide and/or 1,2-propylene oxide in the above-mentioned diols and/or triols as initiator molecules. These compounds are preferably used in amounts of from 0 to 20% by weight based on the total weight of the polyol blend.

Flame retardants that may be used include pentabromodiphenyl oxide; dibromopropanol; tris(β-chloropropyl) phosphate; 2,2-bis(bromoethyl)1,3-propanediol; tetrakis(2-chloroethyl)ethylene diphosphate; tris(2,3-dibromopropyl) phosphate; tris(β-chloroethyle)phosphate; tris(1,2-dichloropropyl)phosphate; bis-(2-chloroethyl)2-chloroethylphosphonate; molybenumtrioxide; ammonium molybdate; ammonium phosphate; pentabromodiphenyloxide; tricresyl phosphate; hexabromocyclododecane; melamine; and dibromoethyldibromocyclohexane. Concentrations of flame retardant compounds, which may be employed range from 15 to 25 parts based on the total weight of the polyol blend.

The foam may further include fillers such as organic, inorganic and reinforcing fillers. Specific examples are: inorganic fillers such as siliceous minerals, for example, sheet silicates such as antigorite, serpentine, hornblends, amphiboles, chrysotile, zeolites, talc; metal oxides, such as kaolin, aluminum oxides, titanium oxides and iron oxides, meta salts, such as chalk, barite, aluminum silicates and inorganic pigments such as cadmium sulfide, zinc sulfide, and also glass particles. Examples of organic fillers are: carbon black, melamine, rosin, cyclopentadienyl resins. The organic and inorganic fillers can be used individually or as mixtures and are advantageously incorporated into the reaction mixture in amounts of from 0.5 to 50% by weight based on the weight of the polyol and the isocyanate component.

To form the foam of the present invention the phase stable polyol blend, catalyst and any other components other than the polyisocyanate component are premixed to form a resin. After formation of the resin, the resin is combined in a mixhead with the polyisocyanate component and the mixture is processed by any of the methods commonly known in the art to form a foam.

EXAMPLES

In the following examples, Polyether polyol A is a sucrose and dipropylene glycol co-initiated polyol having only propylene oxide as the alkylene oxide portion of the polyol. Polyether polyol B is a toluene diamine (TDA)-initiated polyol having only propylene oxide as the alkylene oxide portion of the polyol. The compatibilizing agent is a butanol-initiated all-propylene oxide polyether surfactant. Potassium octoate is an organo-metal catalyst. Blowing catalyst is a pentamethyl diethylenetriamine catalyst. Polyester polyol is a phthalic anhydride-initiated polyester polyol. Flame retardant is a tris(2-chloropropyl)phosphate flame retardant. Hydrocarbon blowing agent is normal pentane. Isocyanate is a polymeric MDI isocyanate.

| Components | Parts by Weight | | | |
|---|---|---|---|---|
| | 1 | 2 | 3 | 4 |
| Polyether Polyol A | 70 | 70 | 60 | 60 |
| Polyether Polyol B | 0 | 30 | 0 | 40 |
| Compatibilizing Agent | 25 | 25 | 25 | 25 |
| Surfactant (B8462) | 4 | 4 | 4 | 4 |
| Potassium Octoate | 5 | 5 | 5 | 5 |
| Blowing Catalyst (PC5) | .5 | .5 | .5 | .5 |
| Polyester Polyol | 30 | 0 | 0 | 0 |
| Flame Retardant | 15 | 15 | 15 | 15 |
| Hydrocarbon Blowing Agent | 26 | 28 | 25.7 | 28.5 |
| Isocyanate | 192.24 | 219.42 | 188.61 | 224.86 |
| Isocyanate Index | 250 | 250 | 250 | 250 |
| Reactivity: (Time in minutes) | | | | |
| Mix | 5 | 5 | 5 | 5 |
| Cream | 10 | 13 | 9 | 11 |
| Gel | 21 | 25 | 18 | 18 |
| Tack Free | 30 | 36 | 26 | 26 |
| Cup Density (PCF) | 1.9 | 2.1 | 2.0 | 2.0 |

All of the components, with the exception of the isocyanate are premixed to form a polyol resin. The resin is then mixed with the isocyanate at the index indicated to form a foam and the foam is allowed to free rise and cure.

As can be seen from the preceding table, various combinations of the aforementioned components may be utilized to produce dimensionally stable foams. The reactivity properties of the various compositions are recorded in the table, detailing the mix, cream, gel, and tack free times of the various compositions. The densities of the foams produced for the various compositions are also recorded in the table. The resulting composition exhibits a phase stable polyol blend that does not separate into distinct composition layers; thereby producing an improved dimensionally stable foam.

As denoted in the preceding table, the different combinations outlined by examples 1 through 4 have relatively similar densities, but have some variations as to cream, gel and tack free times. All of the examples exhibit phase stability; that is, there is no separation into distinct layers for at least 24 hours after blending the resin components.

The present invention has been described in accordance with the relevant legal standards, thus the foregoing description is exemplary rather than limiting in nature. Variations and modifications to the disclosed embodiment may become apparent to those skilled in the art. Accordingly, the scope of legal protection afforded this invention can only be determined by studying the following claims.

What is claimed is:

1. A polyol blend composition comprising:
    a) a sucrose and dipropylene glycol co-initiated propylene oxide polyether polyol;
    b) a polyester polyol;
    c) a compatibilizing agent comprising a butanol-initiated propylene oxide polyether surfactant; and
    d) a hydrocarbon blowing agent comprising $C_4$–$C_6$ hydrocarbons and mixtures thereof; and
   wherein said polyol blend composition is phase stable for at least 24 hours after blending components a)–d).

2. The polyol blend composition of claim 1, wherein the sucrose and dipropylene glycol co-initiated polyol is present in an amount of from 30 to 80 parts by weight based on the total weight of the polyol blend composition.

3. The polyol blend composition of claim 1, wherein the polyester polyol comprises a phthalic anhydride-initiated polyester polyol.

4. The polyol blend composition of claim 3, wherein the phthalic anhydride-initiated polyol is present in an amount of from 15 to 25 parts by weight based on the total weight of the polyol blend composition.

5. The polyol blend composition of claim 1, wherein the compatibilizing agent is present in an amount of from 10 to 20 parts by weight based on the total weight of the polyol blend composition.

6. The polyol blend composition of claim 1, wherein the hydrocarbon blowing agent is present in an amount of from 10 to 20 parts by weight based on the total weight of the polyol blend composition.

7. The polyol blend composition of claim 1, wherein the hydrocarbon blowing agent comprises normal pentane.

8. The polyol blend composition of claim 1, further including a second polyether polyol other than the sucrose and dipropylene co-initiated propylene oxide polyether polyol.

9. The polyol blend composition of claim 8, wherein the second polyether polyol comprises a toluene diamine-initiated propylene oxide polyether polyol.

10. The polyol blend composition of claim 1, further comprising at least one of a flame retardant, a cross-linking agent, a chain extender, an ultraviolet stabilizer, a surfactant or a filler.

11. A polyol blend composition comprising:
    a) a sucrose and dipropylene glycol co-initiated propylene oxide polyether polyol;
    b) a toluene diamine-initiated propylene oxide polyether polyol;
    c) a phthalic anhydride-initiated polyester polyol;
    d) a compatibilizing agent comprising a butanol-initiated propylene oxide polyether surfactant;
    e) a hydrocarbon blowing agent comprising a $C_4$–$C_6$ hydrocarbon and mixtures thereof; and wherein said polyol blend composition is phase stable for at least 24 hours after blending components a)–e).

12. The polyol blend composition of claim 11, wherein the sucrose and dipropylene glycol co-initiated polyol is present in an amount of from 30 to 80 parts by weight based on the total weight of the polyol blend composition.

13. The polyol blend composition of claim 11, wherein the compatibilizing agent is present in an amount of from 10 to 20 parts by weight based on the total weight of the polyol blend composition.

14. The polyol blend composition of claim 11, wherein the hydrocarbon blowing agent is present in an amount of from 10 to 20 parts by weight based on the total weight of the polyol blend composition.

15. The polyol blend composition of claim 11, wherein the toluene diamine-initiated polyether polyol is present in an amount of from 15 to 25 parts by weight based on the total weight of the polyol blend composition.

16. The polyol blend composition of claim 11, further comprising at least one of a flame retardant, a cross-linking agent, a chain extender, an ultraviolet stabilizer, a surfactant or a filler.

17. A polyurethane foam comprising the reaction product of an organic polyisocyanate and a polyol blend composition comprising:

a) a sucrose and dipropylene glycol co-initiated propylene oxide polyether polyol;
   b) a polyester polyol;
   c) a compatibilizing agent comprising a butanol-initiated propylene oxide polyether surfactant; and
   d) a hydrocarbon blowing agent comprising $C_4$–$C_6$ hydrocarbons and mixtures thereof;

wherein said polyol blend composition is phase stable for at least 24 hours after blending components a)–d) of said polyol blend composition.

18. The foam of claim 17, wherein the sucrose and dipropylene glycol co-initiated polyol is present in an amount of from 30 to 80 parts by weight based on the total weight of the polyol blend composition.

19. The foam of claim 17, wherein the polyester polyol comprises a phthalic anhydride-initiated polyester polyol in an amount of from 15 to 25 parts by weight based on the total weight of the polyol blend composition.

20. The foam of claim 17, wherein the compatibilizing agent is present in an amount of from 10 to 20 parts by weight based on the total weight of the polyol blend composition.

21. The foam of claim 17, wherein the hydrocarbon blowing agent comprises normal pentane in an amount of from 10 to 20 parts by weight based on the total weight of the polyol blend composition.

22. The foam of claim 17, wherein the polyol blend composition further comprises a second polyether polyol which comprises a toluene diamine-initiated propylene oxide polyether polyol.

23. The foam of claim 17, wherein the polyol blend composition further comprises at least one of a flame retardant, a cross-linking agent, a chain extender, an ultraviolet stabilizer, a surfactant or a filler.

* * * * *